(12) United States Patent
Yang

(10) Patent No.: US 12,245,264 B2
(45) Date of Patent: Mar. 4, 2025

(54) METHOD AND DEVICE FOR DETERMINING SR CONFIGURATION, AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 546 days.

(21) Appl. No.: 17/430,710

(22) PCT Filed: Feb. 14, 2019

(86) PCT No.: PCT/CN2019/075081
§ 371 (c)(1),
(2) Date: Aug. 12, 2021

(87) PCT Pub. No.: WO2020/164053
PCT Pub. Date: Aug. 20, 2020

(65) Prior Publication Data
US 2022/0150913 A1    May 12, 2022

(51) Int. Cl.
*H04W 72/543*    (2023.01)
*H04W 4/40*    (2018.01)
(Continued)

(52) U.S. Cl.
CPC ..... *H04W 72/543* (2023.01); *H04W 28/0268* (2013.01); *H04W 28/24* (2013.01); *H04W 72/20* (2023.01); *H04W 4/40* (2018.02)

(58) Field of Classification Search
CPC ........... H04W 72/543; H04W 28/0268; H04W 28/24; H04W 72/20; H04W 4/40;
(Continued)

(56) References Cited

U.S. PATENT DOCUMENTS

2018/0317123 A1 * 11/2018 Chen .................. H04W 72/21
2018/0368156 A1   12/2018 Agiwal et al.
(Continued)

FOREIGN PATENT DOCUMENTS

| CN | 109152066 A | 1/2019 |
| CN | 109314841 A | 2/2019 |
| WO | 2018232307 A1 | 12/2018 |

OTHER PUBLICATIONS

"Consideration on NR V2X mode 1 resource allocation" 3GPP TSG-RAN WG2#104 Spokane, USA, Nov. 12-16, 2018 (R2-1816980) (Year: 2018).*
(Continued)

*Primary Examiner* — Sun Jong Kim
(74) *Attorney, Agent, or Firm* — Arch & Lake LLP

(57) ABSTRACT

A method for determining a schedule request, SR, configuration, applied in a terminal, including: sending, by the terminal, sidelink information to a base station, where the sidelink information includes a quality of service, QoS, parameter corresponding to a first logical channel for transmitting a first sidelink data flow; receiving, by the terminal, SR configuration information generated by the base station based on the sidelink information, where the SR configuration information is configured to indicate an SR configuration of the first logical channel; and determining, by the terminal, the SR configuration of the first logical channel based on the SR configuration information.

11 Claims, 11 Drawing Sheets

(51) Int. Cl.
  *H04W 28/02* (2009.01)
  *H04W 28/24* (2009.01)
  *H04W 72/20* (2023.01)

(58) Field of Classification Search
  CPC ............. H04W 72/21; H04W 72/1263; H04W 72/542; H04W 72/25; H04W 72/27; H04W 72/29
  See application file for complete search history.

(56) References Cited

U.S. PATENT DOCUMENTS

| | | | |
|---|---|---|---|
| 2019/0124015 A1 | 4/2019 | Loehr et al. | |
| 2020/0314869 A1* | 10/2020 | Xu | H04W 72/23 |
| 2021/0258853 A1* | 8/2021 | Wang | H04W 36/0009 |

OTHER PUBLICATIONS

First Office Action of Chinese Patent Application No. 201980000139.7 dated Oct. 25, 2021 with English translation, (12p).
International Search Report issued in PCT/CN2019/075081 dated Nov. 1, 2019 with English translation, (4p).
ZTE, Sanechips, "Consideration on NR V2X mode 1 resource allocation", R2-1816980, Nov. 2, 2018, (4p).
Huawei, Hisilicon, "Support of QoS for PC5-based V2X transport", R2-164917, Aug. 13, 2016, (6p).
Extended European Search Report issued in Application No. 19914867.7, dated Aug. 4, 2022,(9p).
"3rd Generation Partnership Project; Technical Specification Group Services and System Aspects; Study on architecture enhancements for EPS and 5G System to support advanced V2X services (Release 16)" 3GPP TR 23.786 V1.1.0 (Sep. 2019) Technical Report, (111p).

* cited by examiner

METHOD AND DEVICE FOR DETERMINING SR CONFIGURATION, AND STORAGE MEDIUM

CROSS-REFERENCE TO RELATED APPLICATION

This application is the U.S. national phase application of International Application No. PCT/CN2019/075081, filed on Feb. 14, 2019, the entire contents of which are incorporated herein by reference for all purposes.

TECHNICAL FIELD

The present disclosure relates to communication technologies, and more particularly, to a method, apparatus and a storage medium for determining a Schedule Request (SR) configuration.

BACKGROUND

In a 5G New Radio (NR) system, it is decided to introduce multiple SR configurations, that is, a plurality of SR configurations may be provided to a terminal, and which SR configuration is used depends on a logical channel that triggers the SR.

On a Uu interface, a base station indicates the SR configurations corresponding to respective logical channels for the terminal by sending to the terminal a Radio Resource Control (RRC) connection reconfiguration message carrying a correspondence relationship between the logical channels and the SR configurations. When the terminal needs to use a logical channel to send data to the base station, if an SR is triggered, it can send the SR to the base station according to the SR configuration corresponding to the logical channel.

For the logical channels for transmitting sidelink data flows established between terminals, since the mapping relationship between the sidelink data flows and the logical channels is determined by the terminals themselves, the base station cannot obtain relevant information of the sidelink data flows transmitted by the respective logical channels, which results in that the base station cannot reasonably and accurately determine the SR configurations of the logical channels.

SUMMARY

The present disclosure provides a method, apparatus, and a storage medium for determining an SR configuration, which is capable of solving the problem that the base station cannot reasonably and accurately provide an SR configuration for a logical channel for transmitting sidelink data flows. The technical solution is as follows.

According to a first aspect of the present disclosure, there is provided a method for determining an SR configuration. The method includes that a terminal sends sidelink information to a base station, where the sidelink information includes a quality of service (QoS) parameter corresponding to a first logical channel for transmitting a first sidelink data flow.

Additionally, the method includes that the terminal receives SR configuration information generated by the base station based on the sidelink information, where the SR configuration information is configured to indicate an SR configuration of the first logical channel.

Furthermore, the method includes that the terminal determines the SR configuration of the first logical channel based on the SR configuration information.

According to a second aspect of the present disclosure, there is provided a method for determining an SR configuration. The method includes that a base station receives sidelink information sent from a terminal, where the sidelink information includes a QoS parameter corresponding to a first logical channel for transmitting a first sidelink data flow.

Additionally, the method includes that the base station generates SR configuration information based on the sidelink information, where the SR configuration information is configured to indicate an SR configuration of the first logical channel.

Furthermore, the method includes that the base station sends the SR configuration information to the terminal.

According to a third aspect of the present disclosure, there is provided an apparatus for determining an SR configuration. The apparatus is applied in a terminal and includes a processor and a memory for storing instructions executable by the processor.

Further, the processor is configured to: send sidelink information to a base station, where the sidelink information includes a QoS parameter corresponding to a first logical channel for transmitting a first sidelink data flow.

Moreover, the processor is configured to: receive SR configuration information generated by the base station based on the sidelink information, where the SR configuration information is configured to indicate an SR configuration of the first logical channel.

Furthermore, the processor is configured to: determine the SR configuration of the first logical channel based on the SR configuration information.

According to a fourth aspect the present disclosure, there is provided an apparatus for determining an SR configuration. The apparatus is applied in a base station and includes: a processor and a memory for storing instructions executable by the processor.

Further, the processor is configured to: receive sidelink information sent from a terminal, where the sidelink information includes a QoS parameter corresponding to a first logical channel for transmitting a first sidelink data flow.

Moreover, the processor is configured to: generate SR configuration information based on the sidelink information, where the SR configuration information is configured to indicate an SR configuration of the first logical channel.

Furthermore, the processor is configured to: send the SR configuration information to the terminal.

According to a fifth aspect of embodiments of the present disclosure, there is provided a non-transitory computer readable storage medium, having stored a computer program thereon, wherein, when executed by a processor, the computer program implements the steps of the method as described in the first aspect or the steps of the method as described in the first aspect.

The technical solution provided by the embodiments of the present disclosure may include the following beneficial effects:

By providing QoS parameters of the QoS flows transmitted on the sidelink to the base station, the base station is able to reasonably and accurately determine an SR configuration of the logical channel for transmitting the QoS flows based on the QoS parameters of the QoS flows.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute part of this specification, illustrate embodiments consistent with the present disclosure, and together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects of the present disclosure, as recited in the appended claims.

The network architecture and business scenarios described in the embodiments of the present disclosure are intended to illustrate the technical solutions of the embodiments of the present disclosure more clearly, and do not impose any limitation on the technical solutions provided by the embodiments of the present disclosure. It is known to those of ordinary skill in the art that the technical solutions provided by the embodiments of the present disclosure are equally applicable to similar technical problems as the evolution of the network architecture and the emerging of new business scenarios.

Figure 1:
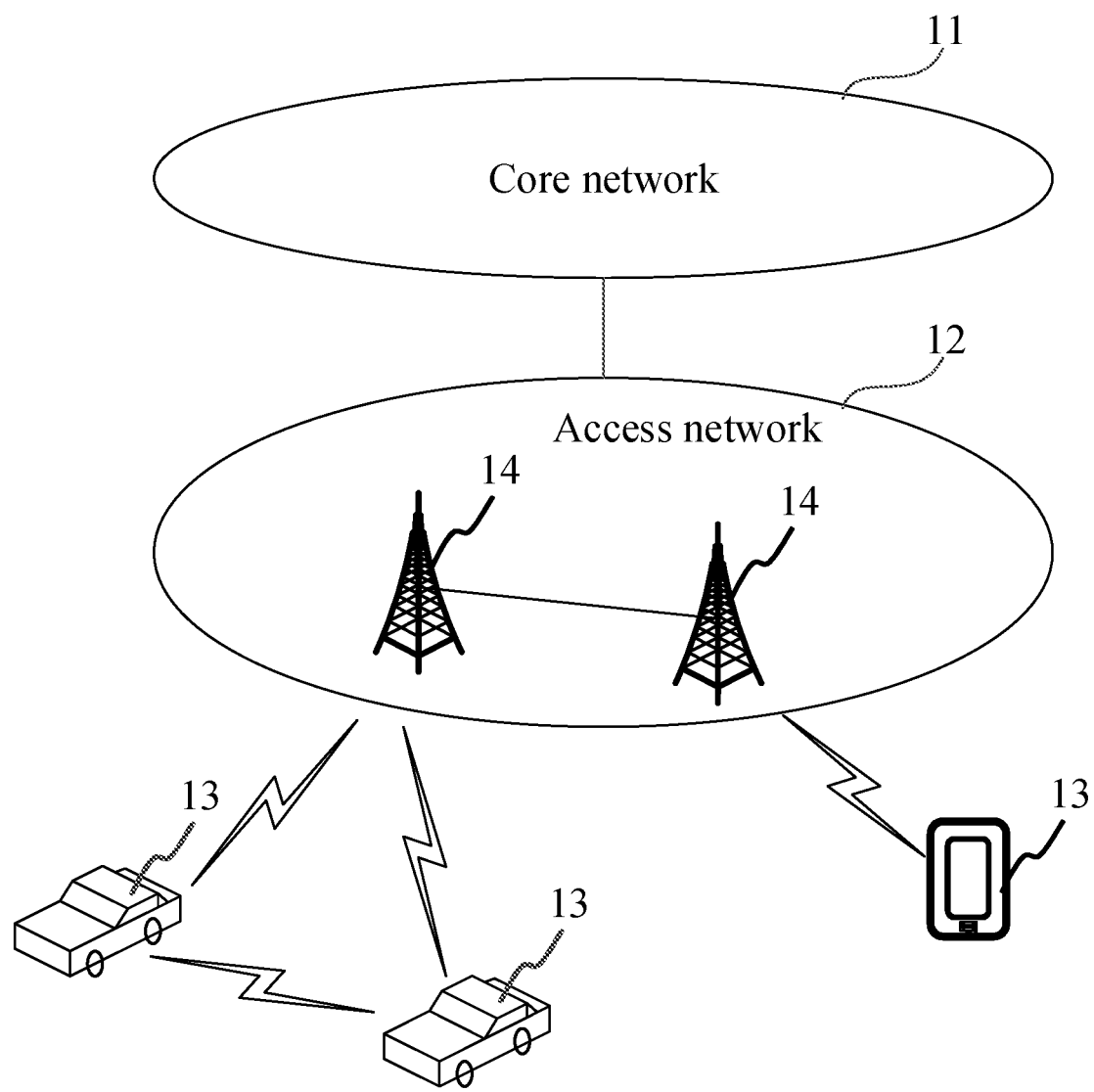
FIG. 1 is a schematic diagram illustrating a network architecture according to an exemplary embodiment.

FIG. 1 is a schematic diagram illustrating a network architecture according to an exemplary embodiment. The network architecture may include: a core network 11, an access network 12 and terminals 13.

A number of core network devices are included in the core network 11. The function of the core network device is mainly to provide user connection, implement management of users and complete carrying of services, to serve as an interface provided from the carrying network to an external network. For example, the core network of a 5G NR system may include devices such as Access and Mobility Management Function (AMF) entities, User Plane Function (UPF) entities, Session Management Function (SMF) entities.

A number of base stations 14 are included in the access network 12. The access network in the 5G NR system may be referred to as a New Generation-Radio Access Network (NG-RAN). The base station 14 is a device deployed in the access network 12 to provide wireless communication functions for the terminals 13. The base station 14 may include various forms of macro base stations, micro base stations, repeater stations, access points and so on. Devices having base station functions in systems adopting different wireless access technologies may have different names, for example, in the 5G NR system, it is called gNodeB or gNB. The name "base station" may change as communication technologies evolve. For the convenience of description, in embodiments of the present disclosure, the above-mentioned devices providing wireless communication functions for the terminals 13 are collectively referred to as base stations.

The number of the terminals 13 is usually plural, and one or more terminals 13 may be distributed within the cell managed by each of the base stations 14. The terminal 13 may include a variety of handheld devices, vehicle-mounted devices, wearable devices, computing devices which have wireless communication functions, or other processing devices connected to a wireless modem, and various forms of User Equipment (UE), Mobile Stations (MS) and terminal devices etc. For ease of description, in the embodiments of the present disclosure, the above-mentioned devices are collectively referred to as terminals.

The base station 14 and the core network device communicate with each other via some kind of air interface technology, such as an NG interface in the 5G NR system. The base station 14 and the terminal 13 communicate with each other via some kind of air interface technology, such as a Uu interface.

Figure 2:
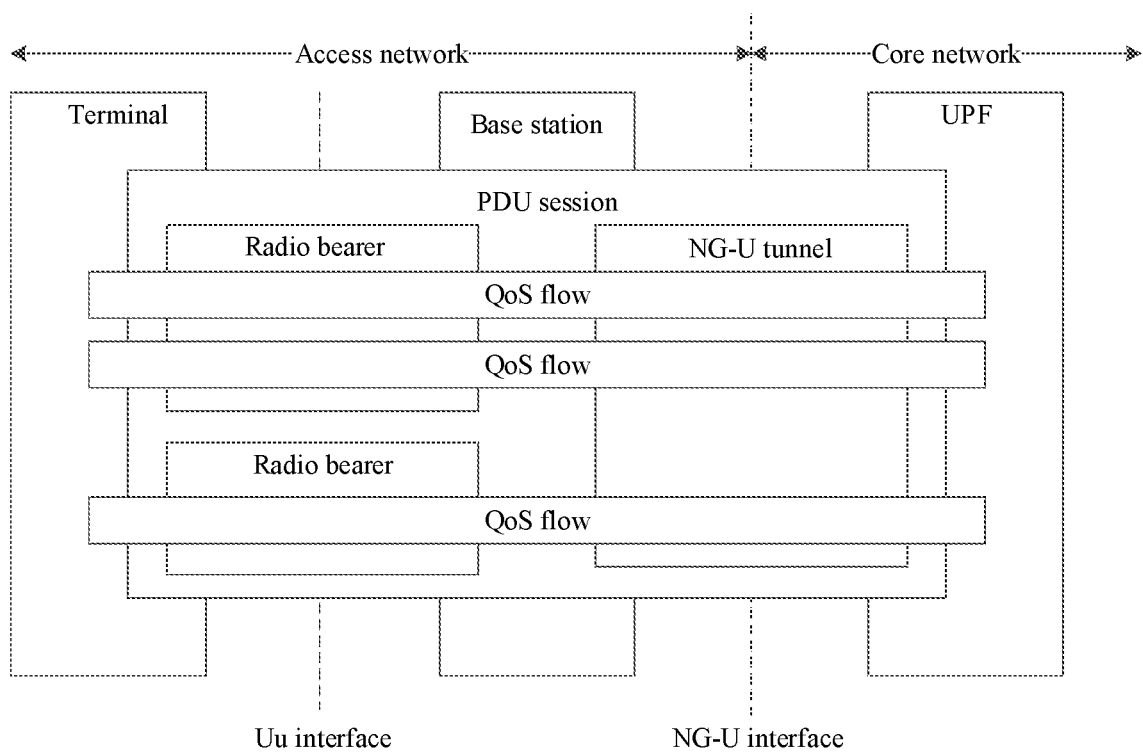
FIG. 2 is a schematic diagram exemplarily illustrating QoS flows for a Uu interface in a 5G NR system.

As shown in FIG. 2, in the 5G NR system, the smallest data transfer granularity of an Access Stratum (AS) is a QoS flow. The QoS flow is the finest QoS differentiation granularity in a Protocol Data Unit (PDU) session, which means that the difference between two PDU sessions is that their QoS flows are different (specifically and generally, Traffic Flow Template (TFT) parameters of the QoS flows are different). In the 5G NR system, identification information of a QoS flow is represented by a QoS Flow ID (QFI), for identifying a QoS flow. User plane data with the same QFI in the PDU session will obtain the same forward processing (e.g. same scheduling, same admittance threshold, etc.). The QFI should be unique within a PDU session, that is, one PDU session may have a plurality of (e.g. up to 64) QoS flows, however, the QFI of each of the QoS flows is different from others (the value range is 0-63), and the QFIs of two PDU sessions of the terminal may be repetitive. The QFI may be dynamically configured or equal to 5-Generation QoS Indicator (5QI). After the QoS flows are received by the AS, the mapping of the QoS flows to a logical channel needs to be completed, for example, one or more QoS flows may be mapped to one logical channel. On the Uu interface, this mapping relationship is controlled by the base station.

Figure 3:
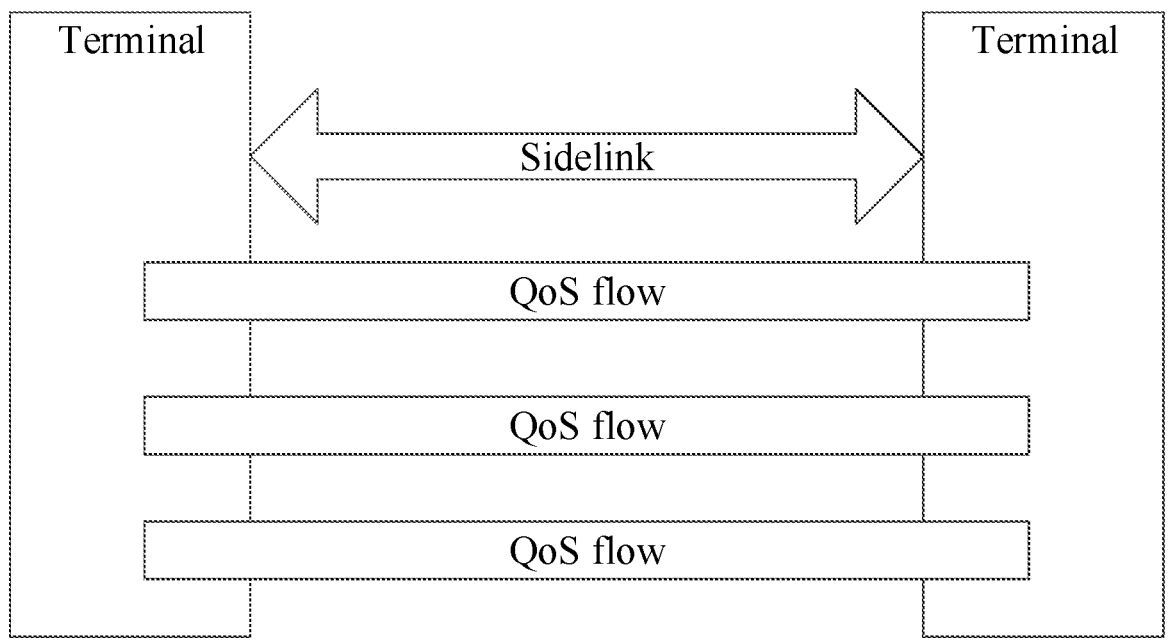
FIG. 3 is a schematic diagram exemplarily illustrating QoS flows for a direct communication interface in a 5G NR system.

In addition, as shown in FIG. 3, the terminal 13 and the terminal 13 (e.g. vehicle-mounted devices and other devices (e.g. other vehicle-mounted devices, mobile phones, Road Side Units (RSUs) etc.)) may communicate with each other via a direct communication interface (e.g. PC5 interface). Accordingly, the communication link established based on the direct communication interface may be called a direct link or a sidelink. Compared to the Uu-based interface communication, the direct communication interface-based communication has characteristics of short delay and low overhead, thus being suitable for communication between two terminals in close geographical proximity (e.g. vehicle-mounted devices and other peripheral devices in close geographical proximity). The smallest data transfer granularity on the sidelink is the QoS flow as well. The QoS of the QoS flow on the sidelink is indicated by a Vehicle QoS Indicator (VQI), which is a numerical value, and each of which indicates a set of quality of service of the QoS flow on the sidelink, including information such as rate, delay, reliability and transmission distance.

The "5G NR system" in the embodiments of the present disclosure may be referred to as a 5G system or a NR system as well, but those skilled in the art can understand its meaning. The technical solution described in the embodiments of the present disclosure may be applicable to the 5G NR system or to an evolved system subsequent to the 5G NR system.

In the embodiments of the present disclosure, with respect to the technical problem mentioned in the background art, by providing QoS parameters of the QoS flows to be transmitted on the sidelink to the base station, the base station, based on the QoS parameters of the QoS flows, is able to reasonably and accurately determine an SR configuration of the logical channel for transmitting the QoS flows.

Hereinafter, the technical solution of the present disclosure will be described by reference to several exemplary embodiments.

Figure 4:
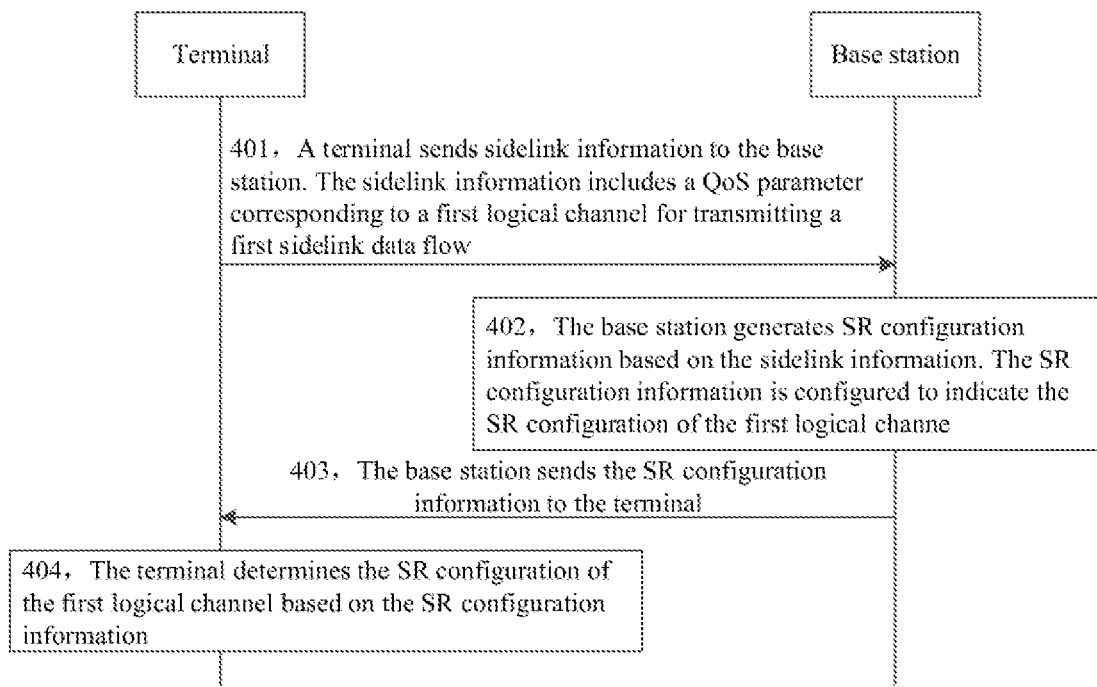
FIG. 4 is a flowchart showing a method for determining an SR configuration according to an exemplary embodiment.

FIG. 4 is a flow chart illustrating a method for determining an SR configuration according to an exemplary embodiment. The method may be applied in the network architecture shown in FIG. 1. The method may include the following steps (401 to 404).

In step 401, the terminal sends sidelink information to the base station. The sidelink information includes a QoS parameter corresponding to a first logical channel for transmitting a first sidelink data flow.

The first sidelink data flow may be any of the QoS flows to be transmitted over the sidelink. In the embodiments of the present disclosure, there is a mapping relationship between the first sidelink data flow and the first logical channel, that is, the first sidelink data flow is transmitted by the first logical channel. The first logical channel may be any one of the sidelink logical channels. Furthermore, the mapping relationship between the first sidelink data flow and the first logical channel may be configured by the terminal or the base station.

There may be only one sidelink data flow, for example, the first sidelink data flow, that is mapped to the first logical channel; or, there may be a plurality of sidelink data flows, for example, including the first sidelink data flow and at least one other sidelink data flow, that are mapped to the first logical channel as well.

The QoS parameter is configured to indicate QoS requirements for the first sidelink data flow, including requirements for rate, delay, reliability and transmission distance, etc. The QoS parameter may be expressed by VQI.

In the embodiments of the present disclosure, the sidelink information is sent to the base station via the terminal. Since the sidelink information includes the QoS parameter corresponding to the first logical channel, the base station is able to obtain the QoS requirements for the QoS flows to be transmitted by the first logical channel.

Furthermore, the sidelink information may be sent to the base station via the sidelink UE information (SidelinkUE-Information), or via other messages, which is not limited by the embodiments of the present disclosure.

In step 402, the base station generates SR configuration information based on the sidelink information. The SR configuration information is configured to indicate the SR configuration of the first logical channel.

After obtaining the QoS parameter of the first sidelink data flow to be transmitted on the first logical channel, the base station configures the corresponding SR configuration for the first logical channel based on the QoS parameter. Optionally, the SR configuration includes, but is not limited to, at least one of the following: an SR disabling timer, a maximum number of times of transmissions of SR, and a time-frequency resource location for SR transmission.

Furthermore, the base station may explicitly indicate the SR configuration of the first logical channel in the SR configuration information, for example, the SR configuration information includes a correspondence relationship between identification information of the first logical channel and the SR configuration of the first logical channel; or, the base station may implicitly indicate the SR configuration of the first logical channel in the SR configuration information as well, for example, the SR configuration information does not directly include a correspondence relationship between the identification information of the first logical channel and the SR configuration of the first logical channel, but includes other information. The terminal determines the SR configuration of the first logical channel based on the said other information. There may be various possible implementations of the specific contents included in the SR configuration information, the details of which can be referred the introduction and illustration of the embodiments below.

In step 403, the base station sends the SR configuration information to the terminal.

Optionally, the SR configuration information is sent to the terminal via an RRC connection reconfiguration (RRCConnectionReconfiguration) message, or via other messages, which is not limited by the embodiments of the present disclosure.

In step 404, the terminal determines the SR configuration of the first logical channel based on the SR configuration information.

After receiving the SR configuration information, the terminal reads content contained in the SR configuration information, and based on the content, determines the SR configuration of the first logical channel.

In addition, when the QoS requirements of the sidelink data flow in the logical channel are changed, the terminal may repeat the procedures of steps 401 to 404 described above to update the SR configuration of the logical channel, to adapt to new QoS requirements.

To sum up, in the technical solution provided by the embodiments of the present disclosure, by providing the QoS parameters of the QoS flows to be transmitted on the sidelink to the base station, the base station, based on the QoS parameters of the QoS flows, is able to reasonably and accurately determine the SR configuration of the logical channel for transmitting the QoS flows.

Figure 5:
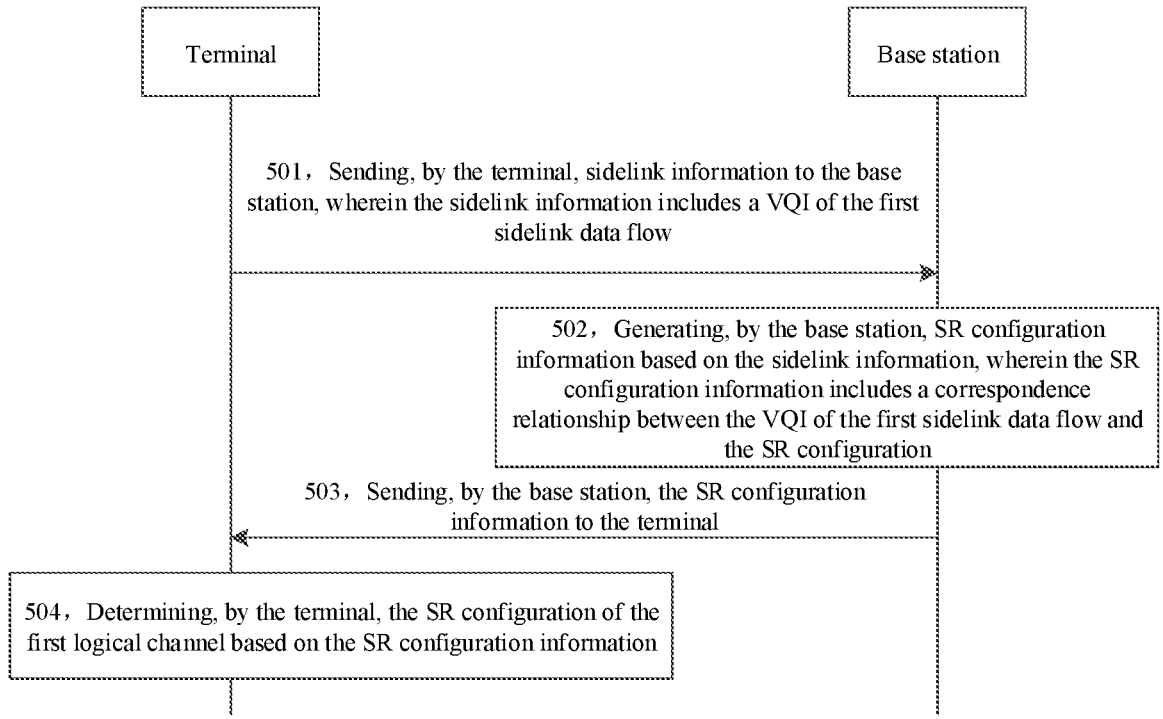
FIG. 5 is a flowchart showing a method for determining an SR configuration according to another exemplary embodiment.

In an optional embodiment provided based on the embodiment of FIG. 4, as shown in FIG. 5, the method may include the following steps (501 to 504).

In step 501, the terminal sends sidelink information to the base station. The sidelink information includes VQI of the first sidelink data flow.

In this embodiment, the sidelink information includes VQI of at least one sidelink data flow that needs to be transmitted by the terminal, and the at least one sidelink data flow includes the first sidelink data flow. Optionally, the sidelink information includes VQIs of all the sidelink data flows that need to be transmitted by the terminal.

For example, the sidelink data flows that need to be transmitted by the terminal include 4 QoS flows, and identification information (i.e. QFI) of the 4 QoS flows are 1, 2, 3 and 4, respectively. Assuming that the VQIs of the 4 QoS flows are 1, 2, 3 and 4, respectively, the sidelink information sent to the base station by the terminal includes a VQI list, which includes the VQIs of all the QoS flows that need to be transmitted by the terminal. That is, the VQI list includes 4 VQIs in total, i.e., 1, 2, 3 and 4.

In this embodiment, the mapping relationship between the sidelink data flow and the logical channel is configured by the terminal. For example, the terminal configures that the QoS flows with QFIs being 1 and 2 are mapped to a logical channel 1, the QoS flow with QFI being 3 is mapped to a logical channel 2, and the QoS flow with QFI being 4 is mapped to the logical channel 3. Furthermore, the terminal may configure that the QoS flows with the same or similar QoS requirements are mapped to the same logical channel.

In one possible implementation, the terminal completes the mapping of the sidelink data flows to the logical channel first, and then the terminal sends to the base station the sidelink terminal information carrying the VQIs of the sidelink data flows in all the logical channels.

In step 502, the base station generates SR configuration information based on the sidelink information. The SR configuration information includes a correspondence relationship between the VQI of the first sidelink data flow and the SR configuration.

After receiving the sidelink information, the base station, according to a VQI list contained in the sidelink information, configures a corresponding SR configuration for each VQI in the VQI list. In the embodiments of the present disclosure, the specific manner in which the base station configures the corresponding SR configuration for the VQI is not limited, for example, the base station may configure different SR configurations for different VQIs, or may configure the same SR configuration for a plurality of VQIs (e.g., similar VQIs), which is not limited by the embodiments of the present disclosure.

In step 503, the base station sends the SR configuration information to the terminal.

Optionally, the base station sends to the terminal an RRC connection reconfiguration message carrying at least one set of SR configuration, and each set of SR configuration corresponds to a list of VQIs.

Exemplarily, the RRC connection reconfiguration message carries an SR parameter A, an SR parameter B, and an SR parameter C, wherein the VQI corresponding to the SR parameter A is 1, the VQI corresponding to the SR parameter B is 2, and the VQIs corresponding to the SR parameter C are 3 and 4.

In step 504, the terminal determines the SR configuration of the first logical channel based on the SR configuration information.

After receiving the SR configuration information, based on a correspondence relationship between the VQI of the first sidelink data flow and the SR configuration and the mapping relationship between the first sidelink data flow and the first logical channel contained in the SR configuration information, the terminal determines the SR configuration corresponding to the VQI of the first sidelink data flow as the SR configuration of the first logical channel. Referring to the above-mentioned examples, since the QoS flow with QFI of 3 is mapped to the logical channel 2, and the QoS flow with QFI of 3 corresponds to the VQI of 3, and corresponds to the SR parameter C, thus the terminal sets the SR parameter corresponding to the logical channel 2 to C.

Optionally, if the first logical channel is used to transmit at least one other sidelink data flow in addition to the first sidelink data flow, the terminal selects the SR configuration corresponding to the VQI maximum value and determines that it is the SR configuration of the first logical channel, based on a correspondence relationship between the VQI of the first sidelink data flow and the SR configuration and correspondence relationships between the VQIs of other sidelink data flows and the SR configurations included in the SR configuration information. Referring to the above example, since the QoS flows with QFIs of 1 and 2 are mapped to the logical channel 1, and the QoS flow with QFI of 1 corresponds to the VQI of 1, and corresponds to the SR parameter A, the QoS flow with QFI of 2 corresponds to the VQI of 2, and corresponds to the SR parameter B, thus the terminal selects the SR configuration corresponding to the VQI maximum value, that is, the SR parameter B corresponding to the VQI of 2 is determined as the SR configuration of the logical channel 1. Through the above manner, when a logical channel maps a plurality of QoS flows having different QoS requirements, by selecting the SR configuration corresponding to the VQI maximum value as the SR configuration of the logical channel, the highest QoS requirements can be met and the reliability of the SR configuration of the logical channel can be ensured.

Moreover, when the QoS requirements of the sidelink data flows in the logical channel are changed, the terminal may repeat the procedures of steps 501 to 504 described above to update the SR configuration of the logical channel, to adapt to new QoS requirements.

Figure 6:
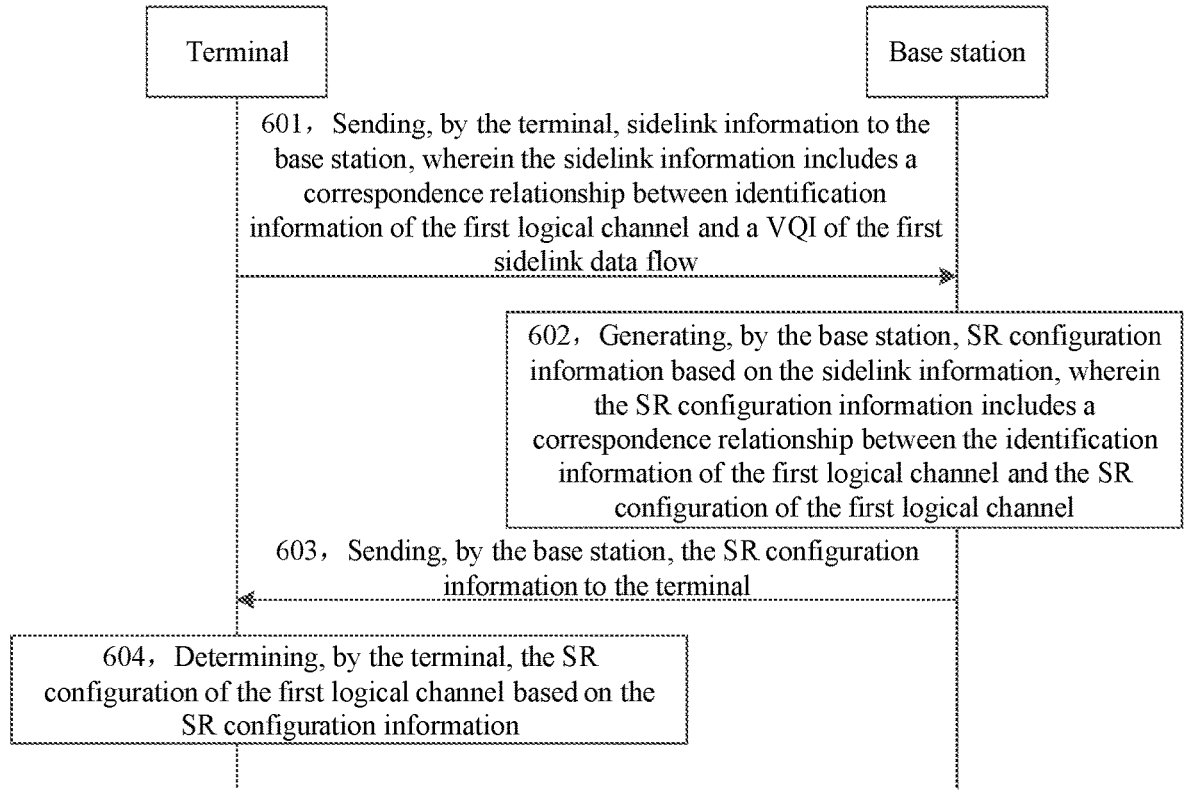
FIG. 6 is a flowchart showing a method for determining an SR configuration according to another exemplary embodiment.

In another optional embodiment provided based on the embodiment of FIG. 4, as shown in FIG. 6, the method may include the following steps (601 to 604).

In step 601, the terminal sends sidelink information to the base station. The sidelink information includes a correspondence relationship between the identification information of the first logical channel and the VQI of the first sidelink data flow.

In this embodiment, the sidelink information includes a correspondence relationship between the VQIs and the logical channels. For example, the sidelink information includes identification information of at least one logical channel created by the terminal for transmitting the sidelink data flow, wherein the at least one logical channel includes the first logical channel; moreover, the sidelink information further includes the VQI corresponding to each logical channel, i.e. the VQI of the sidelink data flow mapped to each logical channel.

For example, the sidelink data flows that need to be transmitted by the terminal include 4 QoS flows, and identification information (i.e. QFI) of the 4 QoS flows are 1, 2, 3 and 4, respectively. Moreover, it is assumed that the VQIs of the 4 QoS flows are 1, 2, 3 and 4, respectively. In this embodiment, the mapping relationship between the sidelink data flow and the logical channel is configured by the terminal. For example, the terminal configures that the QoS flows with QFIs being 1 and 2 are mapped to the logical channel 1, the QoS flow with QFI being 3 is mapped to the logical channel 2, and the QoS flow with QFI being 4 is mapped to the logical channel 3. Furthermore, the terminal may configure that the QoS flows with the same or similar QoS requirements are mapped to the same logical channel. In this way, the sidelink information sent by the terminal to the base station includes a correspondence relationship between the logical channel 1 and VQI 1 and VQI 2, a correspondence relationship between the logical channel 2 and VQI 3, and a correspondence relationship between the logical channel 3 and VQI 4.

In step 602, the base station generates SR configuration information based on the sidelink information. The SR configuration information includes a correspondence relationship between the identification information of the first logical channel and the SR configuration of the first logical channel.

After receiving the sidelink information, the base station configures the corresponding SR configuration for the respective logical channels based on a correspondence relationship between the logical channels and the VQIs included in the sidelink information. In embodiments of the present disclosure, there is no limitation on the specific manner in which the base station configures the corresponding SR configuration for the logical channel, for example, when a logical channel corresponds to a plurality of VQIs, the base station determines the SR configuration of the logical channel based on the VQI maximum value in the plurality of VQIs, thereby satisfying the highest QoS requirements to ensure the reliability of the SR configuration of the logical channel. In addition, the base station may configure different SR configurations for different logical channels, or configure the same SR configuration for different logical channels, which is not limited by the embodiments of the present disclosure.

Still referring to the above-mentioned examples, the SR configuration information generated by the base station may include: a correspondence relationship between the logical channel 1 and the SR parameter B, and a correspondence relationship between the logical channels 2 and 3 and the SR parameter C.

In step 603, the base station sends the SR configuration information to the terminal.

The SR configuration information may be sent to the terminal via an RRC connection reconfiguration message or via other messages, which is not limited by the embodiments of the present disclosure.

In step 604, the terminal determines the SR configuration of the first logical channel based on the SR configuration information.

After receiving the SR configuration information, the terminal reads correspondence relationships between the logical channels and the SR configurations contained in the SR configuration information, thereby determining the SR configurations for the respective logical channels.

Still referring to the above-described examples, the terminal sets the SR parameter corresponding to the logical channel 1 to be B, and the SR parameters corresponding to the logical channels 2 and 3 to be C.

Furthermore, when the QoS requirements for the sidelink data flows in the logical channel are changed, the terminal may repeat the procedures of the above-described steps 601 to 604 to update the SR configuration of the logical channel, to adapt to new QoS requirements.

Figure 7:
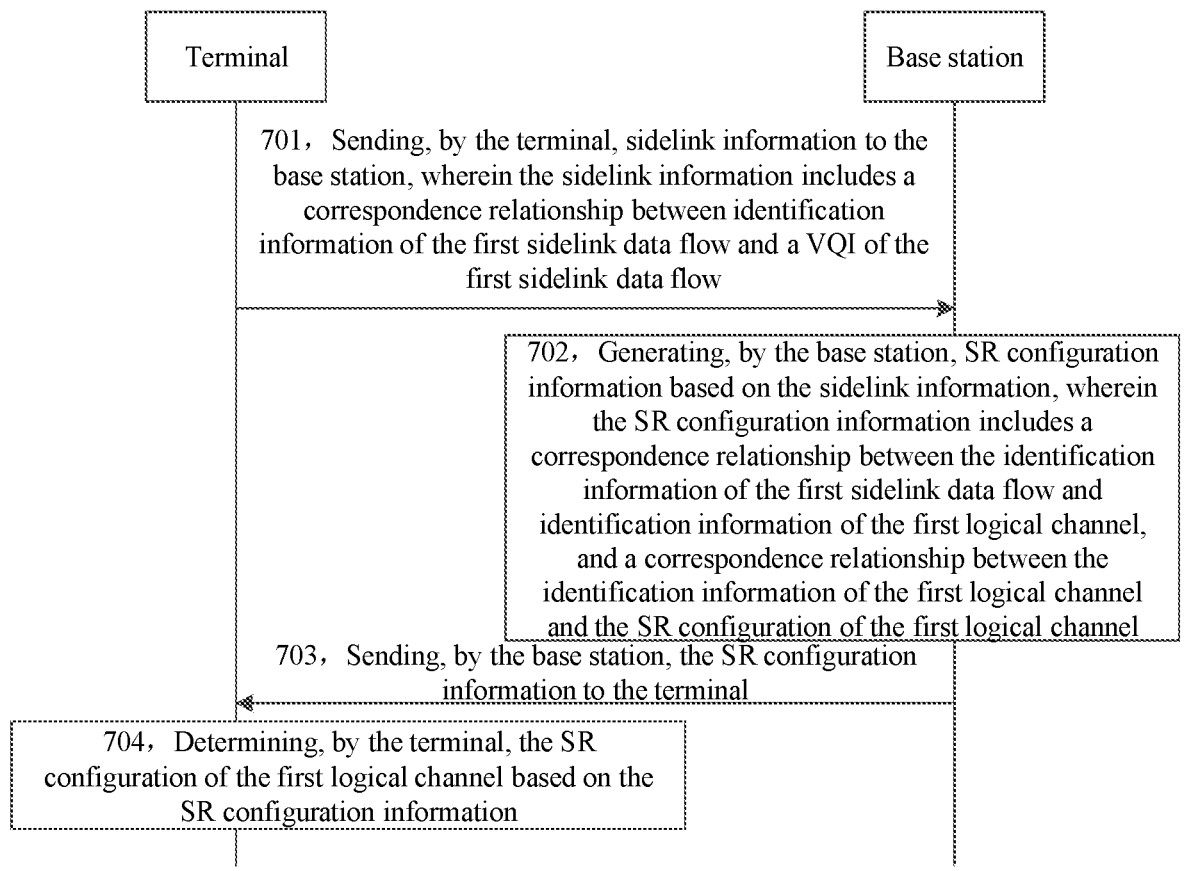
FIG. 7 is a flowchart showing a method for determining an SR configuration according to another exemplary embodiment.

In another optional embodiment provided based on the embodiment of FIG. 4, as shown in FIG. 7, the method may include the following steps (701 to 704).

In step 701, the terminal sends the sidelink information to the base station. The sidelink information includes a correspondence relationship between the identification information of the first sidelink data flow and the VQI of the first sidelink data flow.

In this embodiment, the sidelink information includes a correspondence relationship between the sidelink data flows and the VQIs. For example, the sidelink information includes a correspondence relationship between identification information of at least one sidelink data flow that needs to be transmitted by the terminal and the VQIs, wherein the at least one sidelink data flow includes the first sidelink data flow. Optionally, the sidelink information includes a correspondence relationship between the identification information of all the sidelink data flows that need to be transmitted by the terminal and the VQIs.

For example, the sidelink data flows that need to be transmitted by the terminal include 4 QoS flows, and identification information (i.e. QFI) of the 4 QoS flows are 1, 2, 3 and 4, respectively, then the sidelink information sent to the base station by the terminal includes a QFI list, which includes the QFIs of all the QoS flows that need to be transmitted by the terminal. That is, the QFI list includes 4 QFIs in total, i.e., 1, 2, 3 and 4. The terminal indicates in the sidelink information that the VQIs corresponding to the respective 4 QFIs described above are 1, 2, 3 and 4, respectively.

In step 702, the base station generates SR configuration information based on the sidelink information. The SR configuration information includes a correspondence relationship between the identification information of the first sidelink data flow and the identification information of the first logical channel, and a correspondence relationship between the identification information of the first logical channel and the SR configuration of the first logical channel.

In this embodiment, the mapping relationship between the sidelink data flows and the logical channels is configured by the base station. For example, the base station configures that the QoS flows with QFIs being 1 and 2 are mapped to the logical channel 1, the QoS flow with QFI being 3 is mapped to the logical channel 2, and the QoS flow with QFI being 4 is mapped to the logical channel 3. In addition, the base station may configure that the QoS flows having the same or similar QoS requirements are mapped to the same logical channel.

In addition, after configuring the mapping relationship between the sidelink data flows and the logical channels, the base station configures the corresponding SR configurations for the respective logical channels according to the QoS requirements for the sidelink data flows corresponding to the respective logical channels. In the embodiments of the present disclosure, there is no limitation on the specific manner in which the base station configures the corresponding SR configuration for the logical channel, for example, when a logical channel corresponds to a plurality of VQIs, the base station determines the SR configuration of the logical channel based on the VQI maximum value in the plurality of VQIs, thereby satisfying the highest QoS requirement to ensure the reliability of the SR configuration of the logical channel. In addition, the base station may configure different SR configurations for different logical channels, or configure the same SR configuration for different logical channels, which is not limited by the embodiments of the present disclosure.

Still referring to the above-described examples, the SR configuration information generated by the base station may include: a correspondence relationship between QFI 1 and QFI 2 and the logical channel 1, a correspondence relationship between QFI 3 and the logical channel 2, and a correspondence relationship between QFI 4 and the logical channel 3; furthermore, the SR configuration information further includes a correspondence relationship between the logical channel 1 and the SR parameter B, and a correspondence relationship between the logical channels 2 and 3 and the SR parameter C.

In step 703, the base station sends the SR configuration information to the terminal.

The SR configuration information may be sent to the terminal via an RRC connection reconfiguration message or via other messages, which is not limited by the embodiments of the present disclosure.

In step 704, the terminal determines the SR configuration of the first logical channel based on the SR configuration information.

After receiving the SR configuration information, the terminal reads correspondence relationships between the sidelink data flows and the logical channels and correspondence relationships between the logical channels and the SR configurations contained in the SR configuration information, thereby completing the mapping between the sidelink data flows and the logical channels and determining the SR configurations of the respective logical channels.

Still referring to the above-described examples, the terminal sets that the QoS flows with QFIs being 1 and 2 are mapped to the logical channel 1, the QoS flow with QFI being 3 is mapped to the logical channel 2, and the QoS flow with QFI being 4 is mapped to the logical channel 3. In addition, the terminal sets the SR parameter corresponding to the logical channel 1 to be B, and sets the SR parameter corresponding to the logical channels 2 and 3 to be C.

In addition, when the QoS requirements for the sidelink data flows in the logical channels are changed, the terminal may repeat the procedures of steps 701 to 704 described above to update the SR configurations of the logical channels, to adapt to new QoS requirements.

In the above-described embodiments of FIGS. 5, 6 and 7, 3 different implementations for configuring the SR configurations for the sidelink logical channels are provided, all of which can realize that the QoS parameters of the QoS flows transmitted on the sidelink are provided to the base station, such that the base station can reasonably and accurately determine the SR configuration of the logical channel for transmitting the QoS flow based on the QoS parameter of the QoS flow. In the 3 kinds of implementations, the control capability of the base station is gradually increased, and correspondingly, signalings interaction between the terminal and the base station are increased. In practical applications, an appropriate implementation may be chosen based on the actual demand.

It shall be noted that, in the above-described method embodiments, the technical solution of the present disclosure is described only from the perspective of the interactions between the terminal and the base station. The above-mentioned steps performed by the terminal may be separately implemented as a method for determining the SR configuration on the terminal side; and the above-mentioned steps performed by the base station may be separately implemented as a method for determining the SR configuration on the base station side.

The following are apparatus embodiments of the present disclosure that may be used to carry out the method embodiments of the present disclosure. For details not disclosed in the apparatus embodiments of the present disclosure, reference can be made to the method embodiments of the present disclosure.

Figure 8:
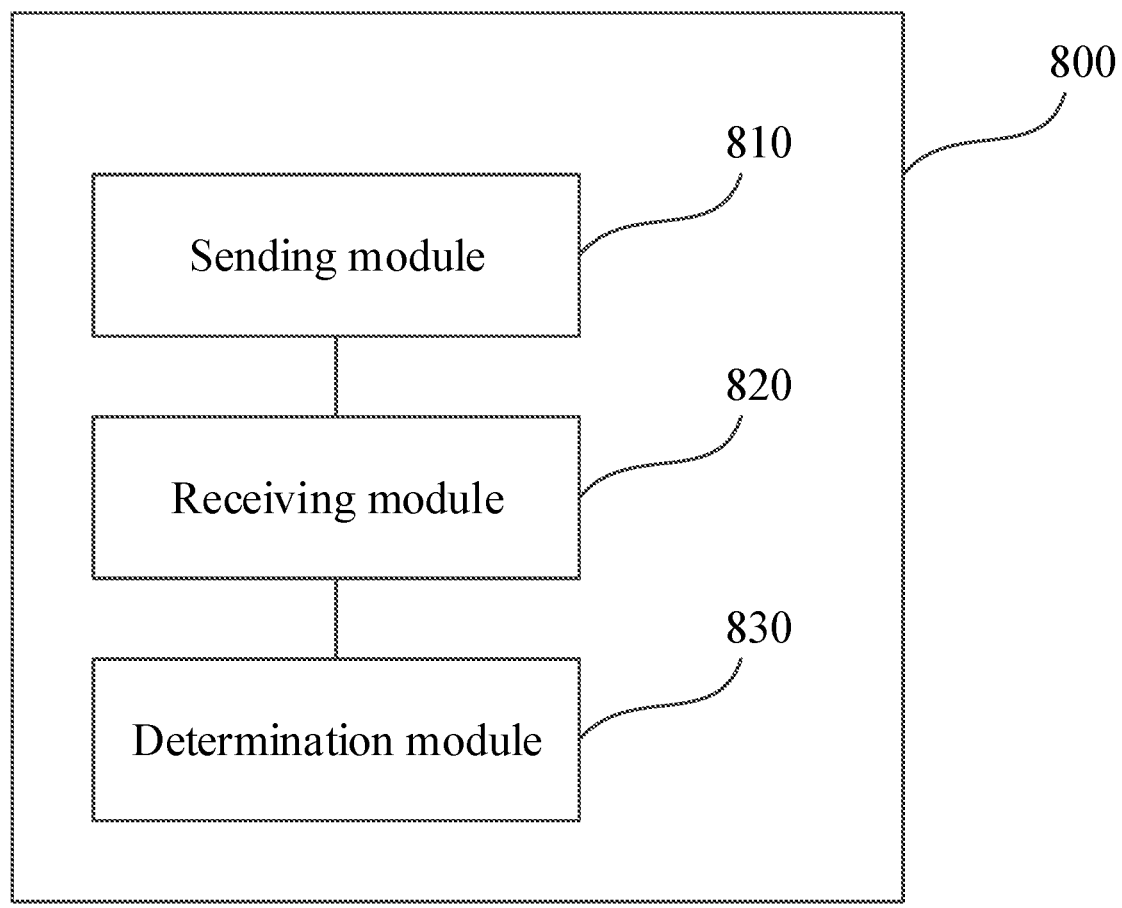
FIG. 8 is a block diagram illustrating an apparatus for determining an SR configuration according to an exemplary embodiment.

FIG. 8 is a block diagram of an apparatus for determining an SR configuration according to an exemplary embodiment. The apparatus has functions to implement the method embodiments on the terminal side, wherein the functions may be implemented by hardware or by hardware executing the corresponding software as well. The apparatus may be used in the terminal described above. As shown in FIG. 8, the apparatus 800 may include: a sending module 810, a receiving module 820 and a determination module 830.

The sending module 810 is configured to send sidelink information to a base station, wherein the sidelink information includes a QoS parameter corresponding to a first logical channel for transmitting a first sidelink data flow.

The receiving module 820 is configured to receive SR configuration information generated by the base station based on the sidelink information, wherein the SR configuration information is configured to indicate the SR configuration of the first logical channel.

The determination module 830 is configured to determine the SR configuration of the first logical channel based on the SR configuration information.

To sum up, in the technical solution provided by the embodiments of the present disclosure, by providing the base station with a QoS parameter of a QoS flow transmitted on a sidelink, the base station is enabled to reasonably and accurately determine an SR configuration of a logical channel for transmitting the QoS flow based on the QoS parameter of the QoS flow.

In an optional embodiment provided based on the embodiment of FIG. 8, the sidelink information includes a VQI of the first sidelink data flow, and the SR configuration information includes a correspondence relationship between the VQI of the first sidelink data flow and the SR configuration.

Optionally, the determination module 830 is configured to, when the first logical channel is further configured to transmit at least one other sidelink data flow, select the SR configuration corresponding to a VQI maximum value and determine that it is the SR configuration of the first logical channel, based on a correspondence relationship between the VQI of the first sidelink data flow and the SR configuration and correspondence relationships between VQIs of other sidelink data flows and the SR configurations included in the SR configuration information.

In another optional embodiment provided by the embodiment of FIG. 8, the sidelink information includes a correspondence relationship between identification information of the first logical channel and the VQI of the first sidelink data flow, and the SR configuration information includes a correspondence relationship between the identification information of the first logical channel and the SR configuration of the first logical channel.

In another optional embodiment provided by the embodiment of FIG. 8, the sidelink information includes a correspondence relationship between identification information of the first sidelink data flow and the VQI of the first sidelink data flow; and the SR configuration information includes a correspondence relationship between the identification information of the first sidelink data flow and the identification information of the first logical channel, and a correspondence relationship between the identification information of the first logical channel and the SR configuration of the first logical channel.

Figure 9:
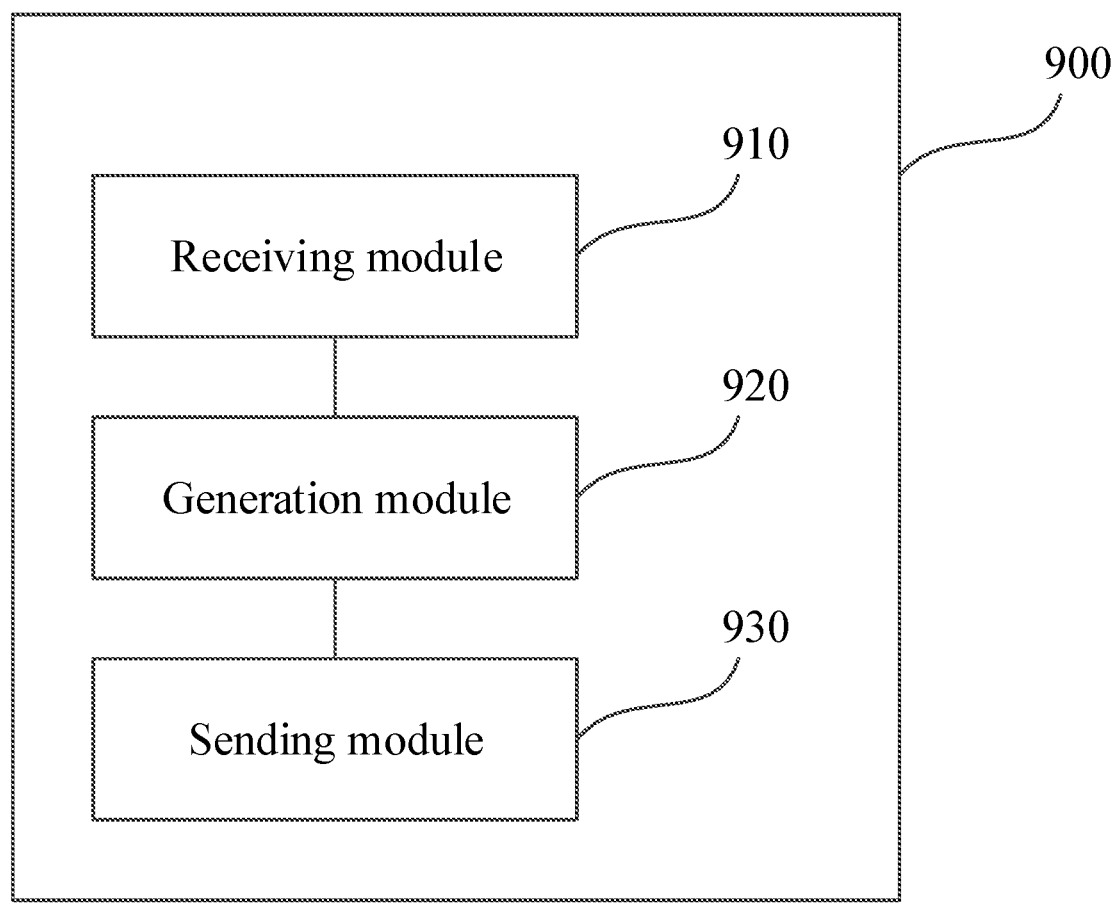
FIG. 9 is a block diagram illustrating an apparatus for determining an SR configuration according to another exemplary embodiment.

FIG. 9 is a block diagram of an apparatus for determining an SR configuration according to another exemplary embodiment. The apparatus has functions to implement the above-mentioned method embodiments on the base station side, wherein the functions may be implemented by hardware or by hardware executing corresponding software. The apparatus may be applied in the base station described above. As shown in FIG. 9, the apparatus 900 may include: a receiving module 910, a generation module 920 and a sending module 930.

The receiving module 910 is configured to receive sidelink information sent from the terminal, wherein the sidelink information includes a QoS parameter corresponding to a first logical channel for transmitting a first sidelink data flow.

The generation module 920 is configured to generate SR configuration information based on the sidelink information, wherein the SR configuration information is configured to indicate the SR configuration of the first logical channel.

The sending module 930 is configured to send the SR configuration information to the terminal.

To sum up, in the technical solution provided by the embodiments of the present disclosure, by providing the base station with a QoS parameter of a QoS flow transmitted on a sidelink, the base station is enabled to reasonably and accurately determine an SR configuration of a logical channel for transmitting the QoS flow based on the QoS parameter of the QoS flow.

In an optional embodiment provided by the embodiments of FIG. 9, the sidelink information includes a VQI of the first sidelink data flow, and the SR configuration information includes a correspondence relationship between the VQI of the first sidelink data flow and the SR configuration.

In another optional embodiment provided by the embodiment of FIG. 9, the sidelink information includes a correspondence relationship between identification information of the first logical channel and the VQI of the first sidelink data flow; and the SR configuration information includes a correspondence relationship between the identification information of the first logical channel and the SR configuration of the first logical channel.

In another optional embodiment provided by the embodiment of FIG. 9, the sidelink information includes a correspondence relationship between identification information of the first sidelink data flow and the VQI of the first sidelink data flow; and the SR configuration information includes a correspondence relationship between the identification information of the first sidelink data flow and the identification information of the first logical channel, and a correspondence relationship between the identification information of the first logical channel and the SR configuration of the first logical channel.

It shall be noticed that the apparatuses provided in the above-mentioned embodiments will be illustrated only by the division of the respective function modules described above when realizing their functions. In practical application, the above-mentioned functions may be assigned to be accomplished by different function modules according to the actual needs, that is, the content structures of the apparatuses are divided into different function modules in order to accomplish all or part of the above-described functions.

With respect to the apparatuses in the above embodiments, the specific manners for performing operations for individual modules therein have been described in detail in the embodiments regarding the methods, which will not be elaborated herein.

An exemplary embodiment of the present disclosure further provides an apparatus for determining an SR configuration. The apparatus may be applied in the terminal described above and is capable of implementing the method for determining the SR configuration on the terminal side provided by the present disclosure. The apparatus may include: a processor and a memory for storing instructions executable by the processor. The processor is configured to:

send sidelink information to a base station, wherein the sidelink information includes a (QoS) parameter corresponding to a first logical channel for transmitting a first sidelink data flow;

receive SR configuration information generated by the base station based on the sidelink information, wherein the SR configuration information is configured to indicate an SR configuration of the first logical channel; and determine the SR configuration of the first logical channel based on the SR configuration information.

Optionally, the sidelink information includes a VQI of the first sidelink data flow; and the SR configuration information includes a correspondence relationship between the VQI of the first sidelink data flow and the SR configuration.

Optionally, the processor is configured to:

when the first logical channel is further configured to transmit at least one other sidelink data flow, select an SR configuration corresponding to a VQI maximum value and determine that it is the SR configuration of the first logical channel, based on a correspondence relationship between the VQI of the first sidelink data flow and the SR configuration and correspondence relationships between VQIs of other sidelink data flows and the SR configurations included in the SR configuration information.

Optionally, the sidelink information includes a correspondence relationship between identification information of the first logical channel and the VQI of the first sidelink data flow; and the SR configuration information includes a correspondence relationship between the identification information of the first logical channel and the SR configuration of the first logical channel.

Optionally, the sidelink information includes a correspondence relationship between identification information of the first sidelink data flow and the VQI of the first sidelink data flow; and the SR configuration information includes a correspondence relationship between the identification information of the first sidelink data flow and the identification information of the first logical channel, and a correspondence relationship between the identification information of the first logical channel and the SR configuration of the first logical channel.

An exemplary embodiment of the present disclosure further provides an apparatus for determining an SR configuration. The apparatus may be applied in the base station described above and is capable of implementing the method for determining the SR configuration on the base station side provided by the present disclosure. The apparatus may include: a processor and a memory for storing instructions executable by the processor. The processor is configured to:

receive sidelink information sent from a terminal, wherein the sidelink information includes a quality of service QoS parameter corresponding to a first logical channel for transmitting a first sidelink data flow;

generate SR configuration information based on the sidelink information, wherein the SR configuration information is configured to indicate an SR configuration of the first logical channel; and send the SR configuration information to the terminal.

Optionally, the sidelink information includes a VQI of the first sidelink data flow; and the SR configuration information includes a correspondence relationship between the VQI of the first sidelink data flow and the SR configuration.

Optionally, the sidelink information includes a correspondence relationship between identification information of the first logical channel and the VQI of the first sidelink data flow; and the SR configuration information includes a correspondence relationship between the identification information of the first logical channel and the SR configuration of the first logical channel.

Optionally, the sidelink information includes a correspondence relationship between identification information of the first sidelink data flow and the VQI of the first sidelink data flow; and the SR configuration information includes a correspondence relationship between the identification information of the first sidelink data flow and the identification information of the first logical channel, and a correspondence relationship between the identification information of the first logical channel and the SR configuration of the first logical channel.

The solution provided by the embodiments of the present disclosure has been described above mainly from the perspective of terminal and base station. It can be understood that in order to implement the above-mentioned functions, the terminal and the base station include corresponding hardware structures and/or software modules that execute the respective functions. The embodiments of the present disclosure can be implemented in the form of hardware or a combination of hardware and computer software by reference to units and algorithmic steps of the examples described in the embodiments of the present disclosure. Whether a particular function is performed by hardware or by computer software driving hardware depends on the particular application and design constraints of the technical solution. A person skilled in the art may use a different method for implementing the described function for each particular application, but such an implementation shall not be considered as going outside the scope of the technical solutions of the embodiments of the present disclosure.

Figure 10:
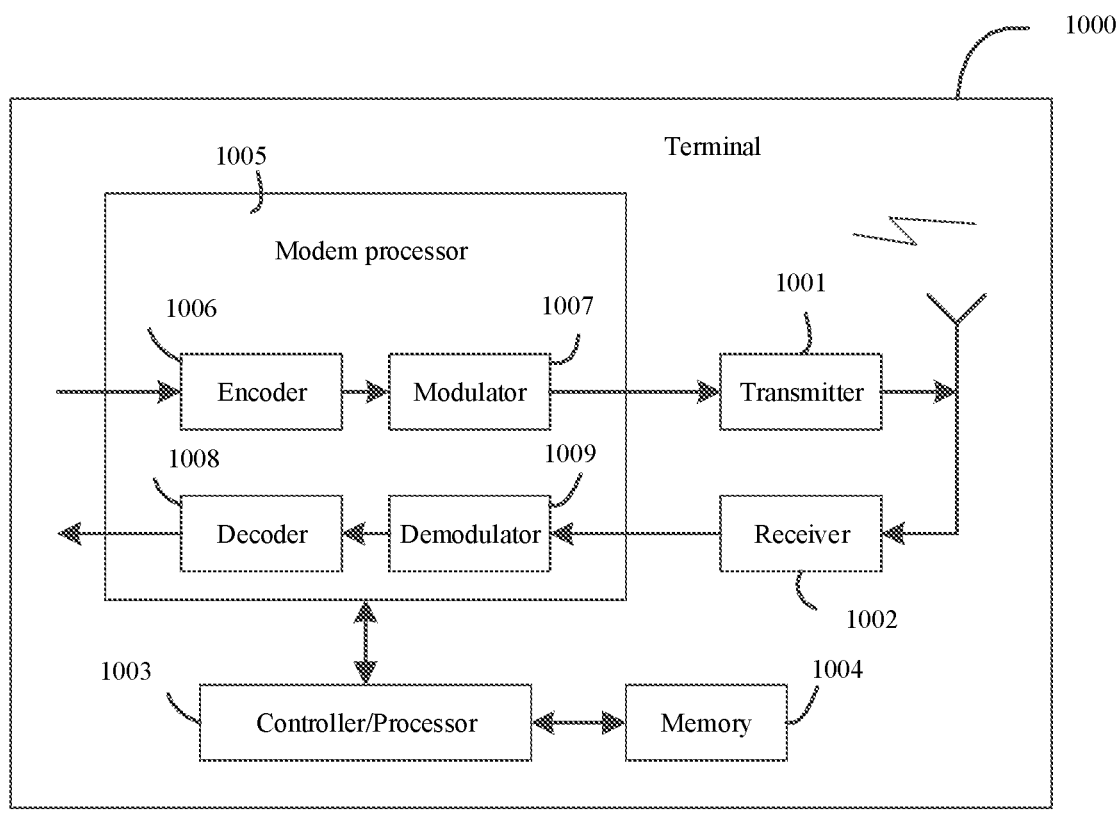
FIG. 10 is a structural schematic diagram illustrating a terminal according to an exemplary embodiment.

FIG. 10 is a structural schematic diagram illustrating a terminal according to an exemplary embodiment.

The terminal 1000 includes a transmitter 1001, a receiver 1002 and a processor 1003. The processor 1003 may be a controller as well, which is indicated as "controller/processor 1003" in FIG. 10. Optionally, the terminal 1000 may further include a modem processor 1005, wherein the modem processor 1005 may include an encoder 1006, a modulator 1007, a decoder 1008 and a demodulator 1009.

In an example, the transmitter 1001 regulates (e.g., analogue converts, filters, amplifies, up-converses, etc.) the output sampling and generates an uplink signal, which is transmitted to the base station through an antenna. On a downlink, the antenna receives a downlink signal emitted from the base station. The receiver 1002 regulates (e.g., filters, amplifies, down-converses and digitizes, etc.) the signal received from the antenna and provides input sampling. In the modem processor 1005, the encoder 1006 receives business data and signalling messages to be sent on an uplink and processes (for example, formats, encodes and interleaves) the business data and the signalling messages. The modulator 1007 further processes (e.g. symbol maps and modulates) the encoded business data and signalling messages and provides output sampling. The demodulator 1009 processes (for example, demodulates) the input sampling and provides symbol estimation. The decoder 1008 processes (for example, deinterleaves and decodes) the symbol estimation and provides the decoded data and signalling messages sent to the terminal 1000. The encoder 1006, the modulator 1007, the demodulator 1009 and the decoder 1008 may be implemented by a synthetized modem processor 1005. The units operates according to the wireless access technology (for example, the access technology of 5G NR and other evolved systems) adopted in a radio access network. It shall be noticed that when the terminal 1000 does not include the modem processor 1005, the above functions of the modem processor 1005 may be performed by the processor 1003 as well.

The processor 1003 controls and manages the actions of the terminal 1000, to perform the processes performed by the terminal 1000 as described above in embodiments of the present disclosure. For example, the processor 1003 is further configured to perform the respective steps on the terminal side of the method embodiments described above, and/or other steps of the technical solutions described in the embodiments of the present disclosure.

Further, the terminal 1000 may further include a memory 1004, which is configured to store program codes and data for the terminal 1000.

It can be appreciated that FIG. 10 only illustrates a simplified design of the terminal 1000. In practical application, the terminal 1000 may include any number of transmitters, receivers, processors, modem processors, memories, etc., and all the terminals that may implement the embodiments of the present disclosure are within the scope of protection of the embodiments of the present disclosure.

Figure 11:
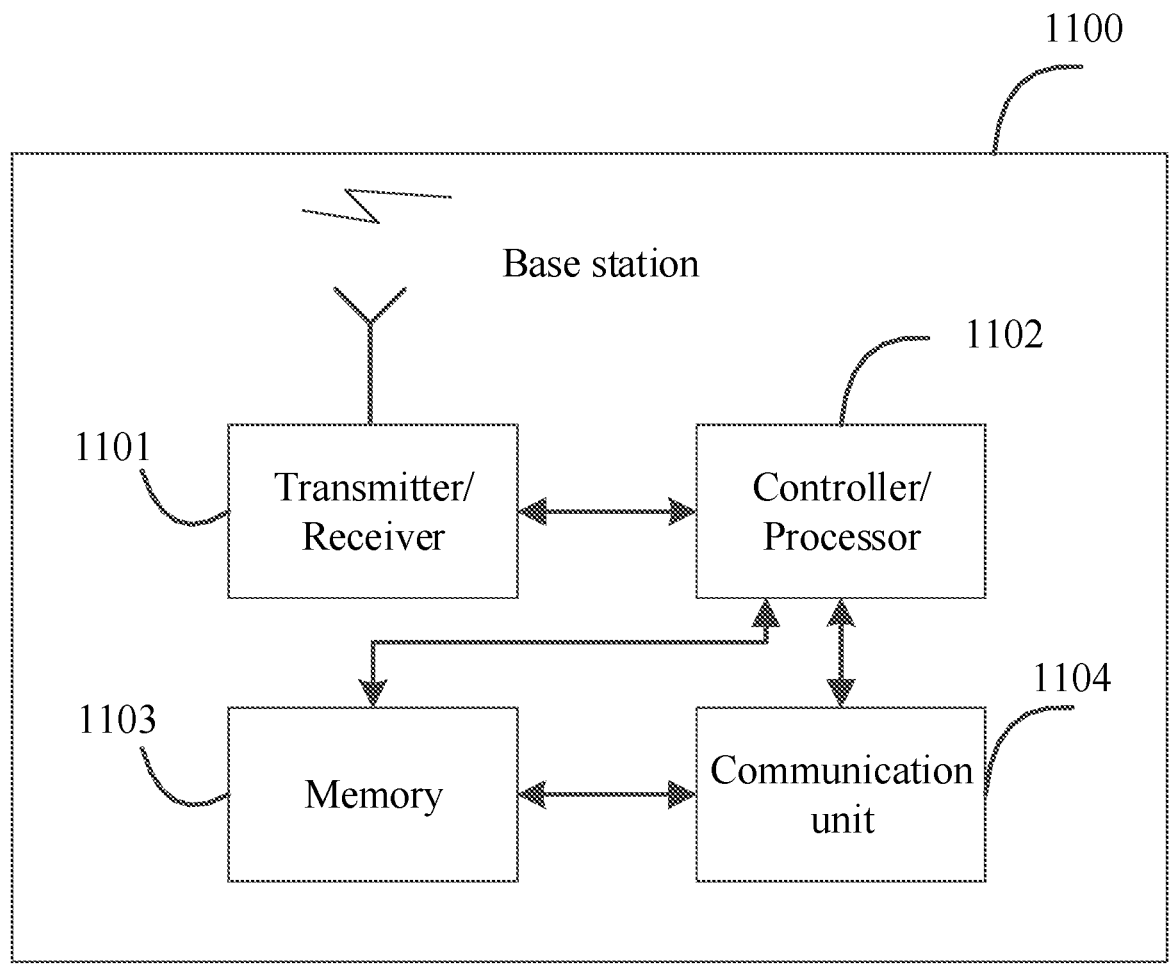
FIG. 11 is a structural schematic diagram illustrating a base station according to an exemplary embodiment.

FIG. 11 is a structural schematic diagram illustrating a base station according to an exemplary embodiment.

The base station 1100 includes a transmitter/receiver 1101 and a processor 1102. The processor 1102 may be a controller as well, which is indicated as "controller/processor 1102" in FIG. 11. The transmitter/receiver 1101 is configured to support the sending and receiving of information between the base station and the terminal in the above-mentioned embodiments as well as communication between the base station and other network entities. The processor 1102 performs various functions for communication with the terminal. In the uplink, the uplink signal from the terminal is received via the antenna, demodulated by the receiver 1101 (for example, a high frequency signal is demodulated into a baseband signal), and further processed by the processor 1102 to restore the business data and signalling information sent by the terminal. On the downlink, the business data and signalling messages are processed by the processor 1102, and modulated by the transmitter 1101 (for example, the baseband signal is modulated into the high frequency signal) to generate the downlink signal, which is transmitted to the terminal via the antenna. It should be noticed that the demodulation or modulation functions described above may be performed by the processor 1102 as well. For example, the processor 1102 is further configured to perform the respective steps on the base station side of the method embodiments described above, and/or other steps of the technical solutions described in the embodiments of the present disclosure.

Further, the base station 1100 may further include a memory 1103, which is configured to store the program codes and data of the base station 1100. In addition, the base station may further include a communication unit 1104. The communication unit 1104 is configured to support communication between the base station and other network entities (e.g. network devices in the core network). For example, in the 5G NR system, the communication unit 1104 may be an NG-U interface for supporting communication between the base station and the User Plane Function (UPF) entities; or, the communication unit 1104 may be an NG-C interface for supporting communication to access to Access and Mobility Management Function (AMF) entities as well.

It will be appreciated that FIG. 11 only illustrates a simplified design of the base station 1100. In practical application, the base station 1100 may include any number of transmitters, receivers, processors, controllers, memories, communication units, etc., and all the base stations that can implement the embodiments of the present disclosure are within the scope of protection of the embodiments of the present disclosure.

Embodiments of the present disclosure further provide a non-transitory computer readable storage medium which stores thereon computer programs that, when executed by the processor of a terminal, implement the steps of the method for determining the SR configuration on the terminal side described above.

Embodiments of the present disclosure further provide a non-transitory computer readable storage medium which stores thereon computer programs that, when executed by the processor of a base station, implement the steps of the method for determining the SR configuration on the base station side described above.

It should be understood that reference to "a plurality of" here refers to two or more, "and/or", which describes the association relationship of associated objects, indicates that three relationships can exist, for example, A and/or B can indicate the presence of A alone, the presence of both A and B. and the presence of B alone. The character "/" generally indicates an "or" relationship between the preceding and following associated objects.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for determining a schedule request (SR) configuration, applied in a terminal, comprising:
   sending, by the terminal, sidelink information to a base station, wherein the sidelink information comprises a quality of service (QOS) parameter corresponding to a first logical channel for transmitting a first sidelink data flow;
   receiving, by the terminal, SR configuration information generated by the base station based on the sidelink information, wherein the SR configuration information is configured to indicate an SR configuration of the first logical channel; and
   determining, by the terminal, the SR configuration of the first logical channel based on the SR configuration information;
   wherein the sidelink information comprises a correspondence relationship between identification information of the first logical channel and a vehicle QoS indicator (VQI) of the first sidelink data flow, the correspondence relationship being configured by the terminal;
   the SR configuration information comprises a correspondence relationship between the identification information of the first logical channel and the SR configuration of the first logical channel; and
   the sidelink information comprises a correspondence relationship between identification information of the first sidelink data flow and the VQI of the first sidelink data flow.

2. The method according to claim 1, wherein
   the sidelink information comprises the VQI of the first sidelink data flow; and
   the SR configuration information comprises a correspondence relationship between the VQI of the first sidelink data flow and the SR configuration.

3. The method according to claim 2, wherein determining, by the terminal, the SR configuration of the first logical channel based on the SR configuration information comprises:
   in response to determining that the first logical channel is further configured to transmit at least one other sidelink data flow, selecting, by the terminal, an SR configuration corresponding to a VQI maximum value and determining that the SR configuration corresponding to the VQI maximum value is the SR configuration of the first logical channel, based on: the correspondence relationship between the VQI of the first sidelink data flow and the SR configuration; and correspondence relationships between VQIs of other sidelink data flows and SR configurations comprised in the SR configuration information.

4. The method according to claim 1, wherein
   the SR configuration information comprises a correspondence relationship between the identification information of the first sidelink data flow and the identification information of the first logical channel.

5. A method for determining a schedule request (SR) configuration, comprising:
   receiving, by a base station, sidelink information sent from a terminal, wherein the sidelink information comprises a quality of service (QOS) parameter corresponding to a first logical channel for transmitting a first sidelink data flow;
   generating, by the base station, SR configuration information based on the sidelink information, wherein the SR configuration information is configured to indicate an SR configuration of the first logical channel; and
   sending, by the base station, the SR configuration information to the terminal;
   wherein the sidelink information comprises a correspondence relationship between identification information of the first logical channel and a vehicle QoS indicator (VQI) of the first sidelink data flow, the correspondence relationship being configured by the terminal;
   the SR configuration information comprises a correspondence relationship between the identification information of the first logical channel and the SR configuration of the first logical channel; and
   the sidelink information comprises a correspondence relationship between identification information of the first sidelink data flow and the VQI of the first sidelink data flow.

6. The method according to claim 5, wherein
the sidelink information comprises the VQI of the first sidelink data flow; and
the SR configuration information comprises a correspondence relationship between the VQI of the first sidelink data flow and the SR configuration.

7. The method according to claim 5, wherein
the SR configuration information comprises a correspondence relationship between the identification information of the first sidelink data flow and the identification information of the first logical channel.

8. An apparatus for determining a schedule request (SR) configuration, applied in a terminal and comprising:
a processor; and
a memory for storing instructions executable by the processor, wherein the processor is configured to:
send sidelink information to a base station, wherein the sidelink information comprises a quality of service (QOS) parameter corresponding to a first logical channel for transmitting a first sidelink data flow;
receive SR configuration information generated by the base station based on the sidelink information, wherein the SR configuration information is configured to indicate an SR configuration of the first logical channel; and
determine the SR configuration of the first logical channel based on the SR configuration information;
wherein the sidelink information comprises a correspondence relationship between identification information of the first logical channel and a vehicle QoS indicator (VQI) of the first sidelink data flow, the correspondence relationship being configured by the terminal;
the SR configuration information comprises a correspondence relationship between the identification information of the first logical channel and the SR configuration of the first logical channel; and
the sidelink information comprises a correspondence relationship between identification information of the first sidelink data flow and the VQI of the first sidelink data flow.

9. An apparatus for determining a schedule request (SR) configuration, applied in the base station and comprising:
a processor; and
a memory for storing instructions executable by the processor,
wherein the processor is configured to perform the method according to claim 5.

10. The apparatus according to claim 8, wherein
the sidelink information comprises the VQI of the first sidelink data flow; and
the SR configuration information comprises a correspondence relationship between the VQI of the first sidelink data flow and the SR configuration.

11. The apparatus according to claim 10, wherein the processor is further configured to:
in response to determining that the first logical channel is further configured to transmit at least one other sidelink data flow, select an SR configuration corresponding to a VQI maximum value and determine that the SR configuration corresponding to the VQI maximum value is the SR configuration of the first logical channel, based on: the correspondence relationship between the VQI of the first sidelink data flow and the SR configuration; and correspondence relationships between VQIs of the other sidelink data flows and SR configurations comprised in the SR configuration information.

* * * * *